United States Patent [19]
Chen

[11] Patent Number: 5,941,606
[45] Date of Patent: Aug. 24, 1999

[54] WHEEL ADAPTED TO BE USED IN A BICYCLE

[76] Inventor: Yung-tang Chen, No. 259, Sanlung Rd. Taliao Hsiang, Kaohsiung Hsien, Taiwan

[21] Appl. No.: 08/771,583

[22] Filed: Dec. 20, 1996

[51] Int. Cl.⁶ .................................................. B60B 1/00
[52] U.S. Cl. ............................... 301/30; 301/58; 301/59; 301/99
[58] Field of Search .................................. 301/55, 56, 58, 301/59, 104, 105.1, 110.5, 110.6, 95, 96, 97, 98, 30

[56] References Cited

U.S. PATENT DOCUMENTS

| | | | |
|---|---|---|---|
| 425,898 | 4/1890 | Morsman et al. | 301/59 |
| 476,118 | 5/1892 | Bailey | 301/59 |
| 1,464,566 | 8/1923 | Ford | 310/110.5 X |
| 4,702,528 | 10/1987 | Sacks | 301/99 |
| 5,653,510 | 8/1997 | Osborne | 301/95 |

FOREIGN PATENT DOCUMENTS

| | | | |
|---|---|---|---|
| 759551 | 2/1934 | France | 301/59 |
| 1012980 | 7/1952 | France | 301/99 |
| 262201 | 10/1989 | Japan | 301/99 |
| 32441 | 9/1897 | United Kingdom | 301/56 |

*Primary Examiner*—Russell D. Stormer
*Attorney, Agent, or Firm*—Kirkpatrick & Lockhart LLP

[57] ABSTRACT

A hub which is configured to have only one flange is able to evenly spread torque acting thereon through spokes securely received between the hub and a rim which is configured to have a plurality of holes defined therein for receiving ends the spokes.

2 Claims, 7 Drawing Sheets

WHEEL ADAPTED TO BE USED IN A BICYCLE

FIELD OF THE INVENTION

The present invention relates to a wheel comprising a hub having a flange with a plurality of through holes defined in a periphery thereof, two cups each integrally formed on a respective side face of the flange and two circular projections each extending from an end of a respective one of the cups and a rim having a plurality of holes defined therein for securing spokes received therein, and more particularly to a wheel having the hub adapted to the rim for use in a bicycle, which is of low wind resistance and weight to give riders good efficiency.

BACKGROUND OF THE INVENTION

Referring to FIGS. 6 and 7, a conventional wheel of a bicycle (not shown) includes a central neck portion with a pair of flanges 42, 43 respectively formed at each of two opposed ends thereof. Each flange 42, 43 has a respective cup 421, 431 extending outwardly therefrom. A passage 41 extends through the hub 40. Each cup 421, 431 defines a recess in communication with the passage 41, and receives a bearing race (not shown). The cup 431 has an external thread 45 for receiving a free-wheel sprocket (not shown). A plurality of holes 422, 432 are respectively defined in the flanges 42, 43 for a respective plurality of spokes 46 to extend therethrough, the spokes 46 further being securely fixed to a rim 50. Each spoke 46 has a hooked end to secure in a respective flange hole 422, 432 and a threaded end to which a nipple 44 engages after the nipple 44 has been inserted into the rim 50. An axle (not shown) extends through the passage 41 and is clamped to rear forks of the bicycle by a pair of nuts (not shown) threadingly mounted to the axle, whereby the wheel may revolve within the rear forks.

The freewheel sprockets presently fitted to bicycles often have six, seven, and even eight individual sprockets and the wheel has to be constructed to have a dished, asymmetric spoking to accommodate the width of the freewheel. Accordingly, as can be seen in FIG. 7, the spokes 46 extending between the rim 50 and the flange 42 have a shorter length than the spokes 46 extending between the rim 50 and the flange 43 which results in differing tensions between the spokes 46. Accordingly, assembly and maintenance of such a dished wheel are difficult. Furthermore, the quantity and arrangement of such spokes 46 mean unnecessarily high weight and wind resistance occur.

From the previous description, it is understood that prior structure of a hub having two flanges and a rim adapted to be used with the hub will no longer satisfactorily meet the needs of a user.

Thus, a hub having a single flange and a rim adapted to be used with the hub for use in a bicycle and constructed in accordance with the present invention tend to mitigate and/or obviate the aforementioned problems.

SUMMARY OF THE INVENTION

The main object of the invention is to provide a hub having only a single flange, two cups each integrally formed on an opposite face of the flange and two circular projections each securely connected with each of the cups and a rim having a plurality of holes defined therein for receiving spokes which connect between the hub and the rim.

An objective of the invention is to produce a low wind resistance coefficient to increase the efficiency of a bicycle having the hub and the rim of the invention mounted thereon.

Other objects, advantages and novel features of the invention will become more apparent from the following detailed description when taken in conjunction with the accompanying drawings.

BRIEF DESCRIPTION OF THE DRAWINGS

The present invention will now be better understood with reference of the accompanying drawings wherein.

DETAILED DESCRIPTION OF THE PREFERRED EMBODIMENT

Figure 1:
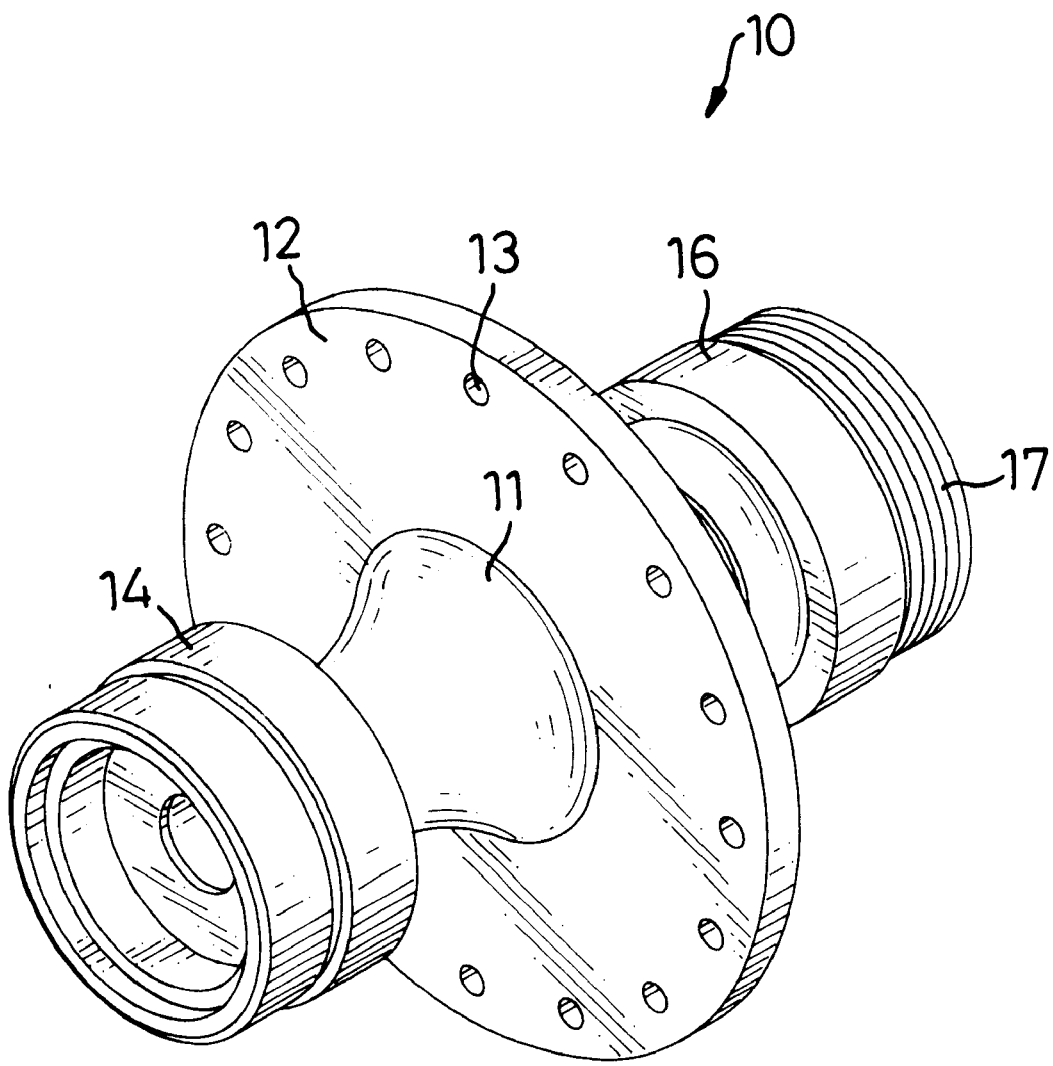
FIG. 1 is a perspective view of a hub constructed in accordance with the present invention.

Referring to FIG. 1, a hub 10 for a wheel, particularly a rear wheel of a bicycle, including a hub 10, spokes 20 and a rim 30 constructed in accordance with the present invention is shown. The hub 10 is configured to have a single flange 12 having a plurality of through holes 13 defined in a periphery thereof, two cups 11 each integrally formed on a respective one of two opposite side faces of the flange 12 and two circular projections in the form of two cups 14, 16 each of the cups 14, 16 securely connected with an end of each of the cups 11. It is noted that the cup 16 is further provided with a threaded exterior portion 17.

Figure 2:
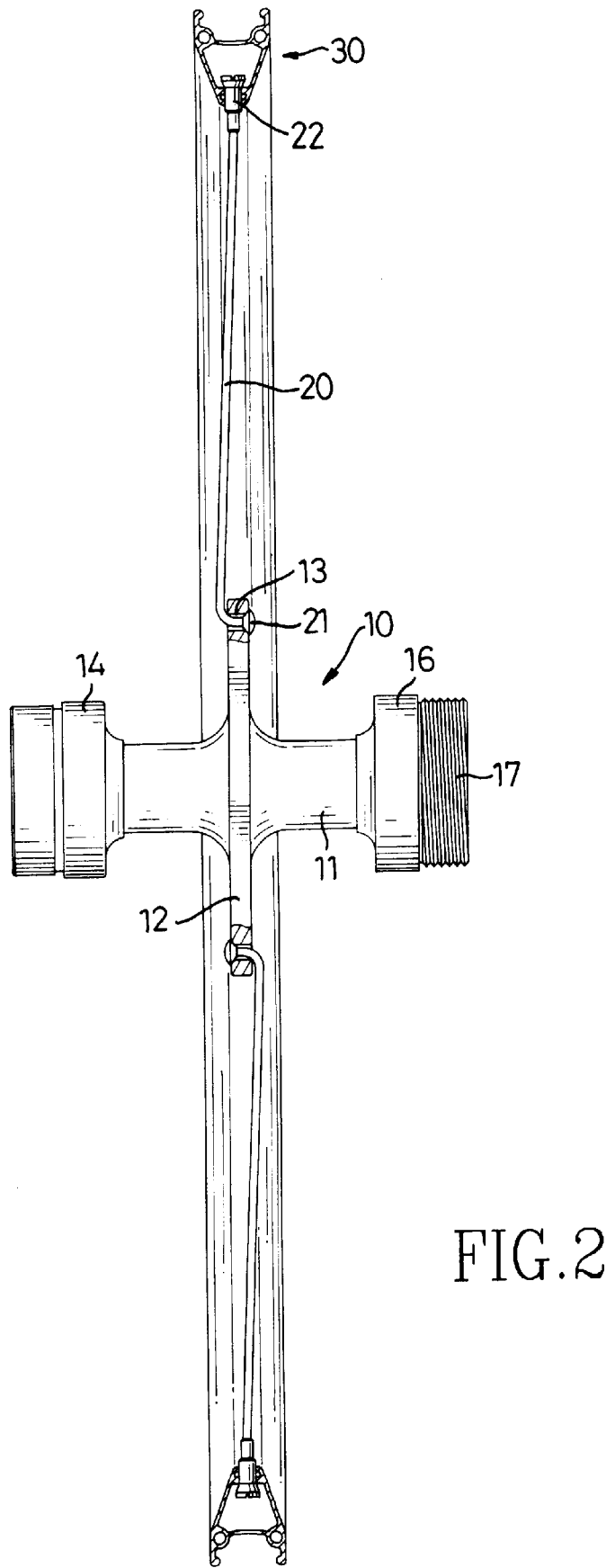
FIG. 2 is a front view of the hub in connection with a rim which is partly in cross section.
Figure 3:
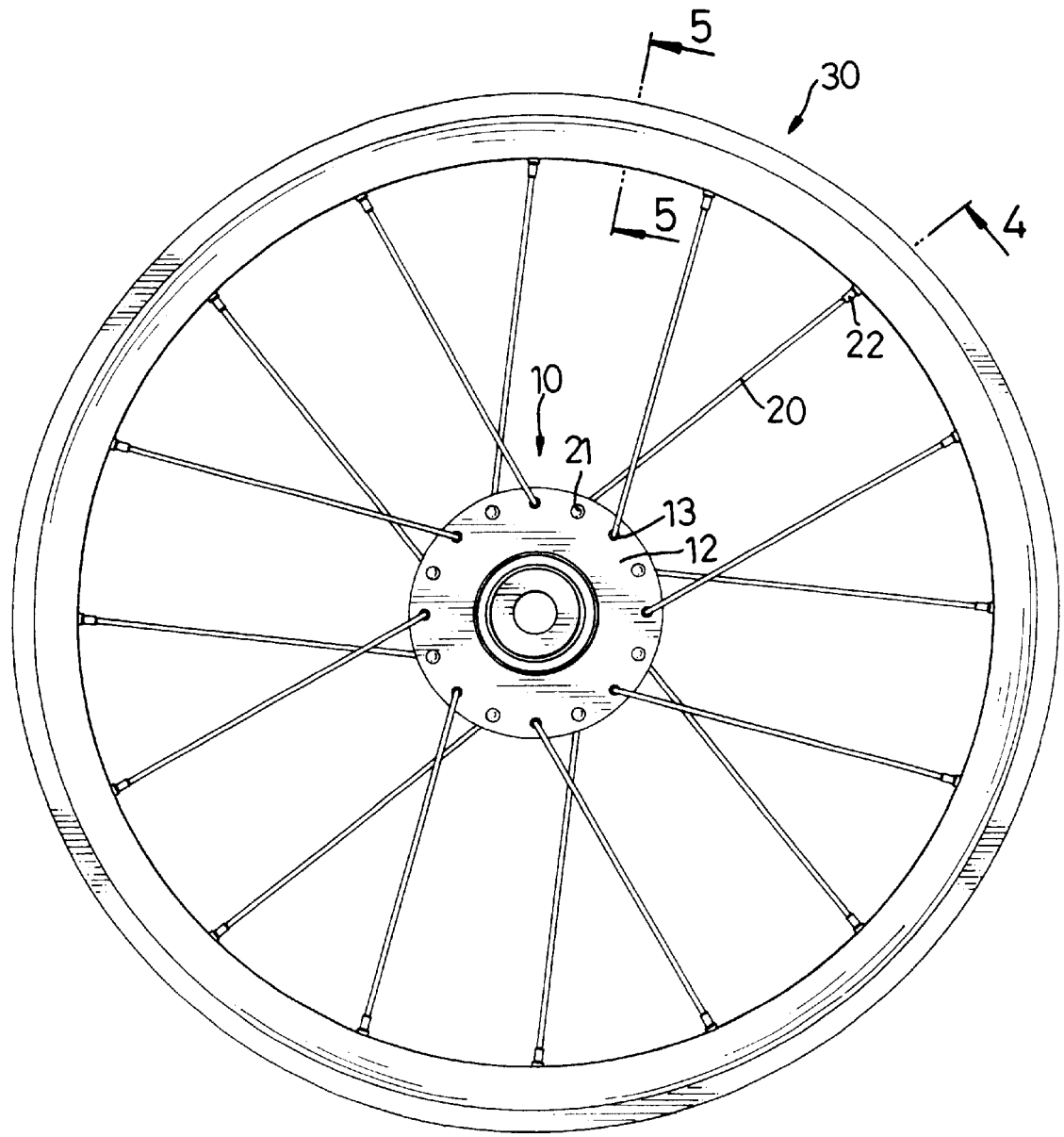
FIG. 3 is a side view of FIG. 2.

Referring to FIG. 2 and taking FIG. 3 for reference, the hub 10 is in connection with the rim 30 by a plurality of the spokes 20, each spoke 20 having a nipple 22 which threadingly engages on a first end thereof and a hook 21 on a second end thereof. Each first end of each spoke 20 is firstly inserted into one of the through holes 13 of the flange 12 and then drawn up to the rim 30 to extend through a respective one of a plurality of holes 32, after which the first end threadingly engages with a respective one of the nipples 22.

Figure 4:
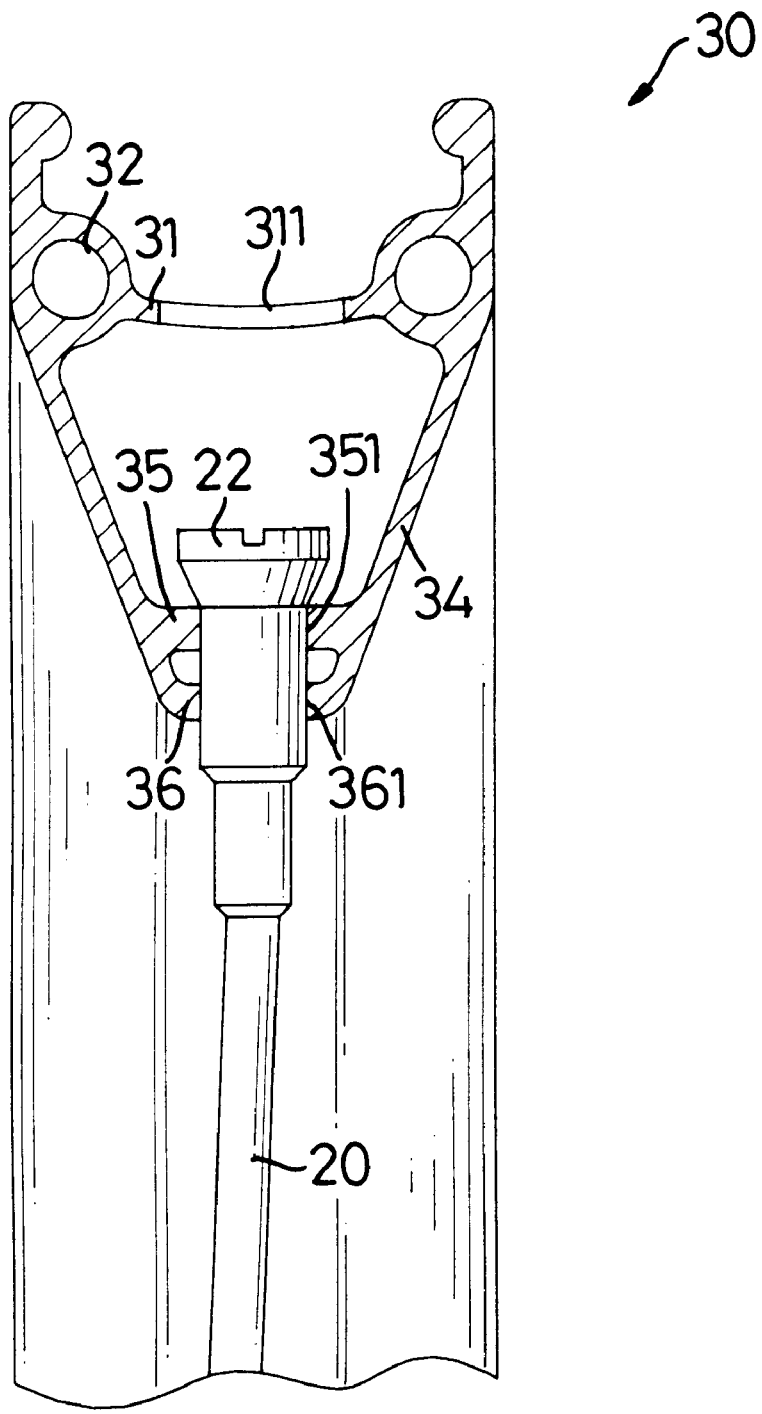
FIG. 4 is a partial cross sectional view of the rim in connection with a spoke.
Figure 5:
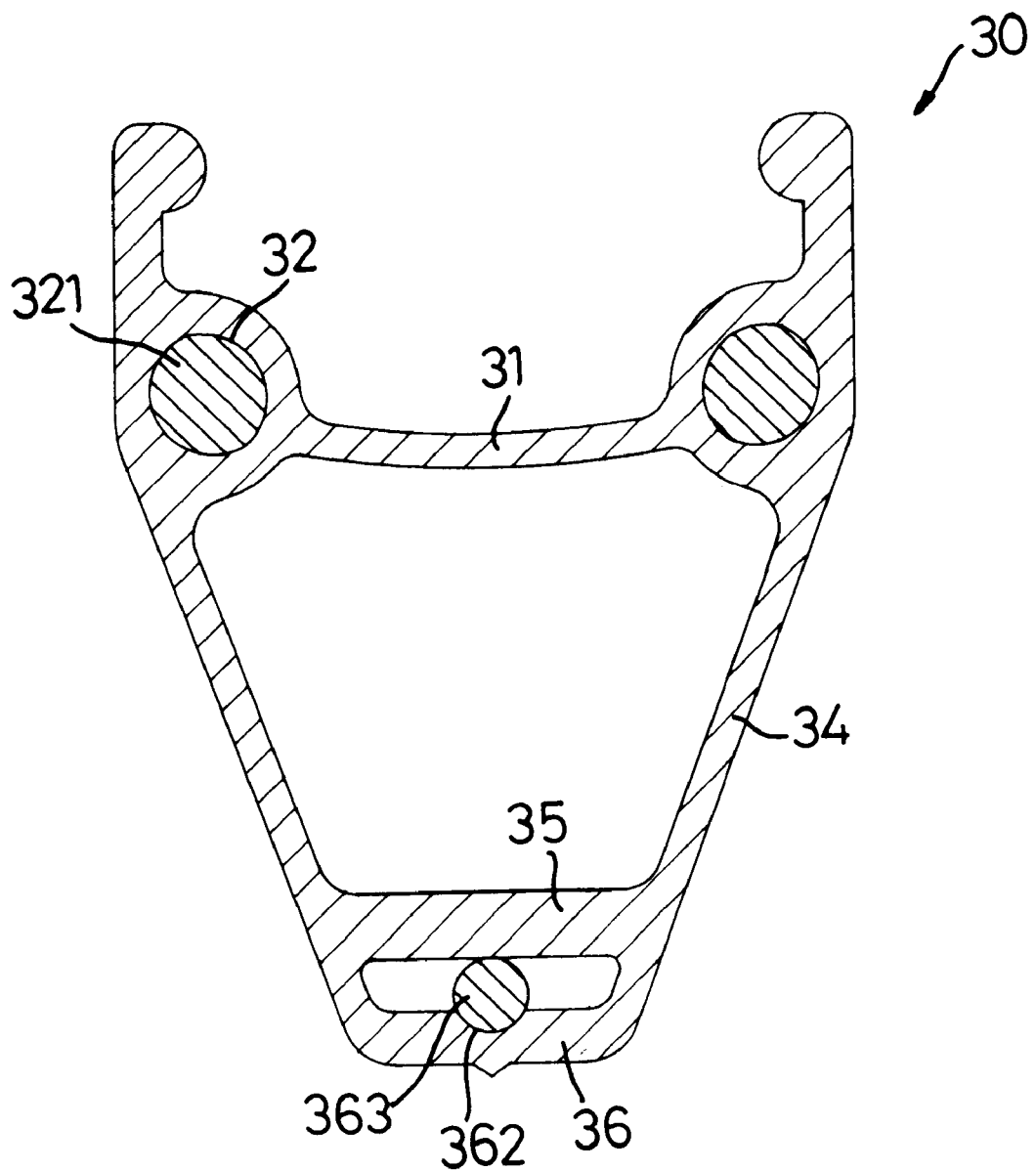
FIG. 5 is a schematic end view of the rim.
Figure 6:
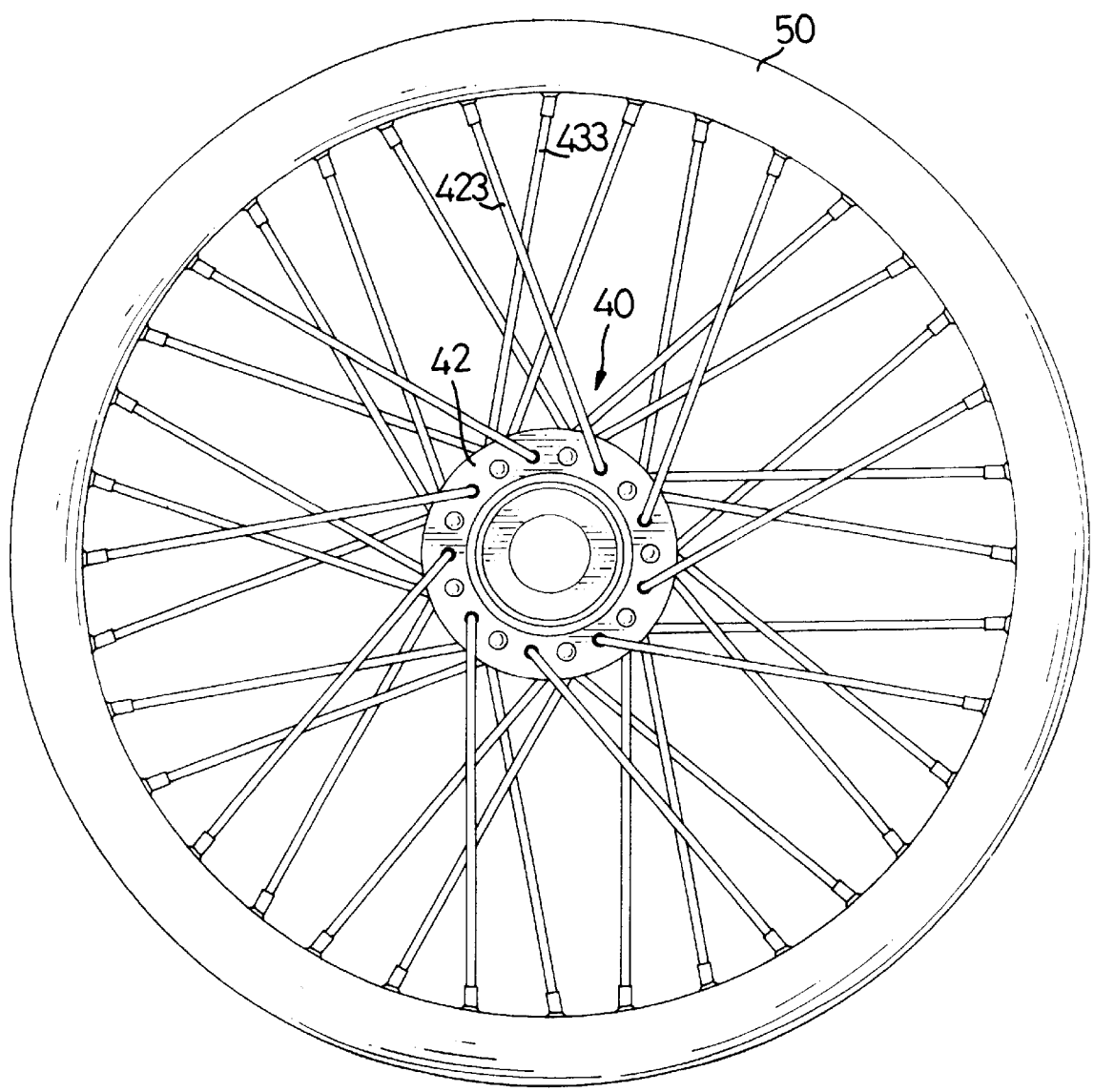
FIG. 6 is a plane view of a prior hub and a prior rim with spokes connected therebetween.
Figure 7:
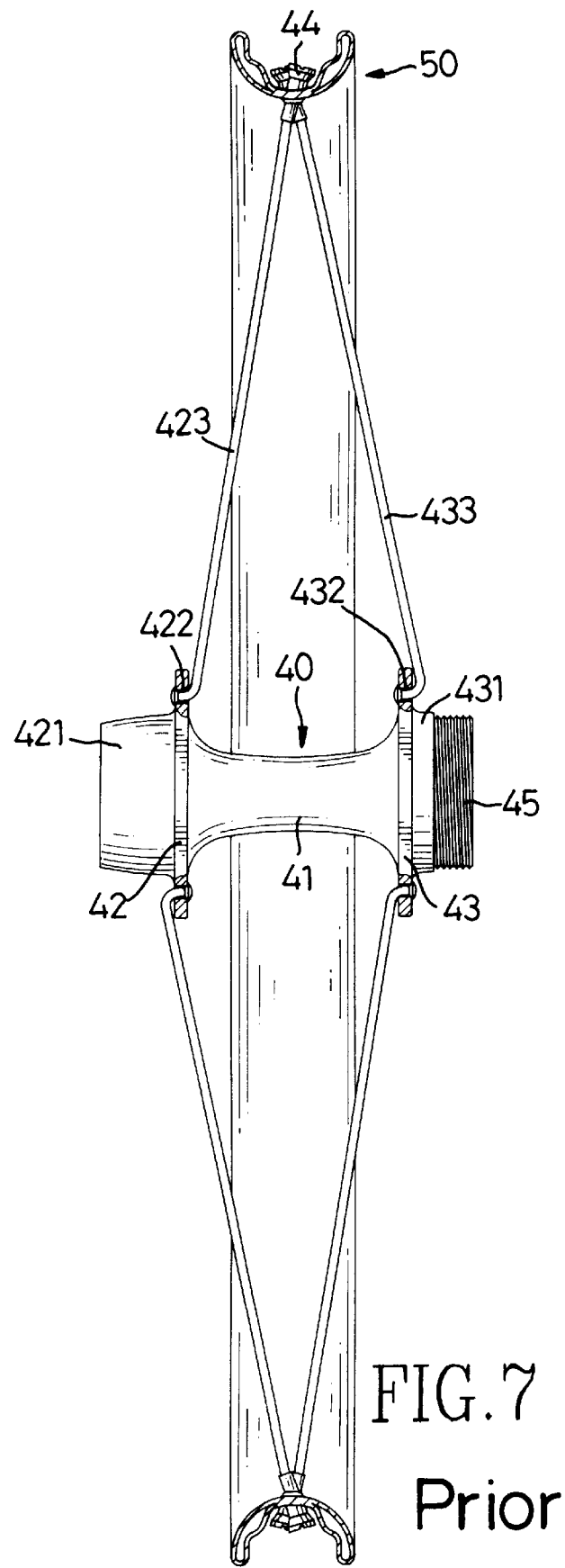
FIG. 7 is a front view of the hub and the rim shown in FIG. 6.

For a better understanding of the relation between the spoke 20 and the rim 30, it is preferred to take FIG. 4 as reference. From a cross sectional view of the rim 30, it is noted that the rim 30 is configured to have a base plate 31 having a centrally defined plurality of first holes 311 therein, two holes 32 respectively defined on either side of the base plate 31, two tapered side walls 34 each formed by an extension of a periphery defining each of the holes 32 in a tangential direction, a middle plate 35 and a bottom plate 36 both integrally and respectively formed on a tapered end of each of the tapered side wall 34 and respectively having a centrally defined second hole 351, and a third hole 361 corresponding to the second hole 351. The rim 30 is constructed in a conventional manner by firstly extruding a bar defining the respective walls and holes then forming it into a circle and forcing a pair of pins 321, as are shown in FIG. 5 partly into a first end defining the holes 32 such that protruding ends of the pins 321 can be forced into the holes 32 of a second end of the rim 30. To further enhance the securing effect the between two ends of the rim 30, it is preferred to define a fourth hole 362 in the two confronting ends of the bottom plate 36, and then use a first pin 363 to insert into each fourth hole 362 of the two confronting ends of the bottom plate 36. Therefore, a strength of the rim 30 which additionally has one second pin 363 securely received between two confronting ends thereof is dramatically increased (as shown in FIG. 5).

Referring to FIGS. 2 and 4, each spoke 20 is firstly extended through one of the through holes 13 of the flange 12 to project through the third hole 361. The nipple 22 is inserted into the first hole 311 to mate with the second hole 351 and the third hole 361 and threadingly engage with the spoke 20. The nipple 22 has a polygonal outer periphery which gives purchase to a wrench whereby the nipple 22 is turned to tighten the spoke 20. It is to be noted that alternate spokes 20 are extended through opposite faces of the flange 12.

From the description above, it is noted that because there is only a single flange 12 provided to the hub 10, the torque acted on each of the spoke 20 is able to be evenly acted on each of the spoke 20 and thus the strength of each of the spoke 20 is balanced. Although the forefoing description has described a rear wheel of a bicycle, it is to be noted that the present invention can be equally applied to a front wheel of a bicycle.

From the foregoing, it is seen that the objects hereinbefore set forth may readily and efficiently be attained, and since certain changes may be made in the above construction and different embodiments of the invention without departing from the scope thereof, it is intended that all matter contained in the above description or shown in the accompanying drawings shall be interpreted as illustrative and not in a limiting sense.

What is claimed is:

1. A bicycle wheel comprising:
   (a) a hub comprising:
      a flange comprising two side faces and a periphery, said periphery including a plurality of generally parallel linear holes therethrough;
      two cups, a said cup securely formed on each said side face of said flange; and
      two circular projections, a said circular projection formed with and extending from each said cup;
   (b) a circular rim comprising;
      a base plate having at least one centrally defined first hole therein and two opposite sides;
      two pin receiving holes, a said pin receiving hole defined in each said opposite side of said base plate, each said pin receiving hole having a periphery;
      two tapered side walls separated by a distance, each said tapered side wall formed by an extension of a said periphery of a said pin receiving hole;
      a middle plate and a bottom plate, said middle plate and said bottom plate both integrally formed on each of said tapered side walls and spanning said distance between said tapered side walls, said middle plate having a centrally defined second hole therethrough, and said bottom plate having a centrally defined third hole therethrough; and
      a fourth hole defined between said middle plate and said bottom plate of said circular rim for receiving a first pin therein; and
   (c) a plurality of spokes, each said spoke of the bicycle wheel disposed through a said linear hole in said periphery of said flange and extending to said rim.

2. A bicycle wheel comprising:
   (a) a hub comprising:
      a flange comprising two side faces and a periphery, said periphery including a plurality of holes therethrough;
      two cups, a said cup securely formed on each said side face of said flange; and
      two circular projections, a said circular projection formed with and extending from each said cup;
   (b) a circular rim comprising:
      a base plate having at least one centrally defined first hole therein and two opposite sides;
      two pin receiving holes, a said pin receiving hole defined in each said opposite side of said base plate, each said pin receiving hole having a periphery;
      two tapered side walls separated by a distance, each said tapered side wall formed by an extension of a said periphery of a said pin receiving hole;
      a middle plate and a bottom plate, said middle plate and said bottom plate both integrally formed on each of said tapered side walls and spanning said distance between said tapered side walls, said middle plate having a centrally defined second hole therethrough, and said bottom plate having a centrally defined third hole therethrough; and
      a fourth hole defined between said middle plate and said bottom plate of said circular rim for receiving a first pin therein; and
   (c) a plurality of spokes connecting said hub and said rim.

* * * * *